(12) United States Patent
Nasr et al.

(10) Patent No.: US 9,789,676 B2
(45) Date of Patent: Oct. 17, 2017

(54) SYSTEM FOR MANUFACTURING A COMPOSITE BUILDING ELEMENT

(71) Applicant: Tiger Profiles and Insulation LLC, Sharjah (AE)

(72) Inventors: Bernard Robert Nasr, Dubai (AE); Kerry Allan Hayes, Dubai (AE)

(73) Assignee: Tiger Profiles and Insulation LLC, Sharjah (AE)

( * ) Notice: Subject to any disclaimer, the term of this patent is extended or adjusted under 35 U.S.C. 154(b) by 251 days.

(21) Appl. No.: 14/394,471

(22) PCT Filed: Apr. 15, 2013

(86) PCT No.: PCT/NZ2013/000066
§ 371 (c)(1),
(2) Date: Oct. 14, 2014

(87) PCT Pub. No.: WO2013/154442
PCT Pub. Date: Oct. 17, 2013

(65) Prior Publication Data
US 2015/0059966 A1    Mar. 5, 2015

(30) Foreign Application Priority Data
Apr. 14, 2012   (NZ) .......................................... 599152

(51) Int. Cl.
| | | |
|---|---|---|
| B29C 44/32 | (2006.01) |
| B32B 37/14 | (2006.01) |
| E04C 2/38 | (2006.01) |
| B29C 45/14 | (2006.01) |
| B21D 47/04 | (2006.01) |
| B32B 37/00 | (2006.01) |

(52) U.S. Cl.
CPC ............ B32B 37/142 (2013.01); B21D 47/04 (2013.01); B29C 44/326 (2013.01); B29C 45/14467 (2013.01); B29C 45/14508 (2013.01); B32B 37/0046 (2013.01); E04C 2/384 (2013.01); B32B 2305/34 (2013.01); *Y10T 156/1002* (2015.01)

(58) Field of Classification Search
None
See application file for complete search history.

(56) References Cited

FOREIGN PATENT DOCUMENTS

| | | |
|---|---|---|
| DE | 102008050391 A1 | 12/2009 |
| EP | 1 215 026 A1 | 6/2002 |
| GB | 2399539 A | 9/2004 |
| WO | 2009/068855 A1 | 6/2009 |

OTHER PUBLICATIONS

European Search Report dated Jan. 26, 2016.

*Primary Examiner* — Barbara J Musser
(74) *Attorney, Agent, or Firm* — Hahn Loeser & Parks, LLP—San Diego

(57) ABSTRACT

The invention relates to a method of manufacturing a composite building element that includes a casing material, a bulk material, and a locking element, the method including the steps of: (a) continuously feeding a first sheet of casing material into a filling station; (b) securing the bulk material to the first sheet of casing material; (c) continuously feeding the bulk material and the first sheet of casing material out of the filling station; the method characterized by the step of: (d) securing the locking element to the first sheet of casing material prior to securing the bulk material to the first sheet of casing material.

11 Claims, 9 Drawing Sheets

SYSTEM FOR MANUFACTURING A COMPOSITE BUILDING ELEMENT

CROSS-REFERENCE TO RELATED APPLICATIONS

The present application is a U.S. National Stage entry under 35 U.S.C. §371 of International Application No. PCT/NZ2013/000066, filed on Apr. 15, 2013, designating the United States of America and published in English on Oct. 17, 2013, which in turn claims priority to New Zealand Patent Application No. 599152, filed on Apr. 14, 2012, each of which is hereby incorporated by reference in its entirety.

TECHNICAL FIELD

The present invention relates to a method of manufacture and system therefor

BACKGROUND ART

Composite sandwich panels are used to construct buildings. These panels can include insulative materials and therefore find particular application in constructing cool stores and large scale fridges.

The panels are formed from at least one, and preferably two, sheets of a casing material. The casing material is generally aluminum, steel, or other hard resilient materials.

An insulation material such as a polyurethane foam is injected into a gap between the sheets of casing material. The foam expands to fill the gap and a curing process is used to set the foam.

Locking element in the form of cooperating cam-lock halves are secured in the sandwich panels. Each half is configured such that in use it interacts with a corresponding locking half on an adjacent sandwich panel. Accordingly, the interaction of the cam-lock elements secures adjacent panels together.

One common method to manufacture composite sandwich panels uses a discontinuous process. The sheets of casing material are first cut to a length necessary to form the desired length of a sandwich panel. The sheets of material are then deformed using a roller press. The deformation ensures that the sandwich panel will have a shape and configuration to facilitate adjacent panels interlocking.

Two sheets of deformed casing material are then inserted into a curing mould.

Locking elements are then secured to the mould. A plurality of male locking elements are secured along the mould at one edge of the sheets of casing material. A plurality of female locking elements are secured to the mould along an edge of the casing materials that is distal to the male locking elements. The position of the locking elements relative to the sheets of casing material is selected so that the finished sandwich panel will have a locking element in a position in which it can engage with another locking element on an adjacent sandwich panel. A polyurethane foam is then injected into a gap between the sheets of casing material.

The mould is then used to cure the polyurethane foam. This secures the locking element and sheets of casing material relative to each other, thereby forming the composite sandwich panel.

The insertion and positioning of locking elements is an important step. Incorrect positioning of the locking elements in a panel would result in the locking elements of two laterally adjacent sandwich panels being unable to engage with each other. Accordingly, the process has traditionally been performed manually. As a result, the production of composite sandwich panels is a labour intensive process.

Furthermore, the necessity for accurate placement of the locking elements hinders efficient manufacturing of composite sandwich panels.

The discontinuous manufacture of composite sandwich panels also hinders the efficient manufacturing of panels. For instance, in discontinuous processes it is difficult to adjust the process to produce panels of different dimensions.

Yet a further problem with the discontinuous manufacture of composite sandwich panels is that this is a slow process. The time to manufacture each panel includes the positioning of the sheet materials, the positioning of the locking element halves, the insertion of the insulation material, and curing time. The set up times are significant. Furthermore, the time to remove a cured composite sandwich panel from the mould is a further down time. In fact, the time to manufacture one composite sandwich panel can often exceed 40 minutes.

There are a number of hindrances to using a continuous process to manufacture composite sandwich panels. A significant problem arises from the need to accurately position locking elements within the sandwich panels. All previous attempts to implement a continuous process to manufacturing composite sandwich panels have focused on using the same steps as in discontinuous processes. However, the methods do not work as the securing the locking element halves to the mould prohibits or hinders a constant feed of casing material into the mould.

Accordingly, there is a need for an improved method of producing insulated sandwich panel building elements.

Alternatively, it is an object of the present invention to address the forgoing problems, or provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

A method of manufacturing a composite building element that includes a casing material, a bulk material, and a locking element, the method including the steps of:
   (a) positioning a first length of the casing material;
   (b) securing the bulk material to the first length of casing material; the method characterised by the step of:
   (c) securing the locking element to the length of casing material.

According to another aspect of the present invention, there is provided a system for manufacturing composite building elements, including a feed station configured to position a length of a casing material, a filler station configured to secure a bulk material to the length of casing material, characterised in that the system includes an insert station that is configured to secure locking elements to the length of casing material.

According to another aspect of the present invention, there is provided a composite building element manufactured using the method as substantially described above.

According to another aspect of the present invention, there is provided a composite building element manufactured using the system as substantially described above.

According to another aspect of the present invention, there is provided a locking element for a composite building element, including a main body, a locking component configured to interact with a corresponding locking component on another locking element, a foot portion, characterised in that the foot has a connection portion configured to fit within a corresponding cavity in a length of a casing material forming part of the composite building element.

In preferred embodiments the present inventions relate to manufacturing of composite building elements.

In preferred embodiments, the present inventions relate to continuous processes (methods) and systems to manufacture composite building elements. In these embodiments, the methods and systems produce composite building panels of indefinite length e.g. the panels are continually output from the filling and/or moulding station. the panel can be subsequently cut to produce composite building elements having a desired length ("a cut panel").

Therefore, the present specification will describe the present inventions with reference to them being "continuous".

Throughout the present specification reference to the term "continuous" should be understood as referring to a process in which materials are constantly fed into one or more of the components of the system. For instance a length of casing material is fed into the system without being cut. That is, a roll of the casing material constantly feeds the material into at least one component of the system.

In contrast, the prior art systems are discontinuous, in that the casing materials are cut to length before being inserted into a mould. Those lengths are held in a fixed position with respect to the mould while a bulk material is secured thereto. Further, there is no continual feed of the casing material, either in discrete lengths of as sheets of indefinite length.

Throughout the present specification, reference to the term "composite building element" should be understood as meaning an assembly of two or more materials that can be used to construct a building.

In a preferred embodiment, the composite building elements are pre-engineered panels.

In a particularly preferred embodiment, the composite buildings elements are composite sandwich panels. Accordingly, reference herein will be made to the composite building element as being sandwich panels.

Throughout the present specification, reference to the term "sandwich panels" should be understood as meaning a building component formed from two or more materials secured together.

In a particularly preferred embodiment, the composite sandwich panels according to the present invention include two or more layers of a casing material, and one or more bulk materials in between the layers of casing material.

However, the forgoing should not be seen as limiting on the scope of the present invention and it is envisaged that the building elements according to the present invention can include more than two layers of casing material, and several layers of bulk material.

Throughout the present specification reference to the term "casing material" should be understood as meaning a material which can provide an outer layer of a sandwich panel.

In a preferred embodiment, the casing materials are provided in the forms of elongate sheets.

In a particularly preferred embodiment, the lengths of casing materials are in a roll or coil. The casing material can be mounted on a feed station (as is discussed below) and fed into components so as to facilitate forming of a sandwich panel.

The inventors have identified that feeding the casing material from rolls facilitates the provision of a continuous method to manufacture composite sandwich panels. This is because the casing material can be continuously feed into a system for forming a composite sandwich panel. That is, the roll provides a sheet of casing material of indefinite length. This is particularly advantageous in increasing the efficiency of manufacture of composite sandwich panels.

However, the forgoing should not be seen as limiting and alternatives are envisaged. These include that the casing materials could be extruded to a required length. Alternatively, sections of materials may be pre-cut to desired lengths and sequentially fed into the system in a continuous process.

In a preferred embodiment, the casing material may be sheet steel, aluminum sheets, sheets of reinforced plastics materials, or other materials suitable for use as the outer layer of a sandwich panel.

In a particularly preferred embodiment, the casing material may be made from, or coated with, a food grade material. This is beneficial as it enables the composite sandwich panels according to the present invention to be used in applications requiring this type of lining.

Furthermore, having the casing material pre-coated with, or made from, a food grade material is a cost effective way to produce these composite sandwich panels.

In contrast, if the casing material is not pre-coated or made from food grade material, then such a coating/lining may need to be applied subsequent to manufacture of the sandwich panel. This would significantly increase the cost of manufacturing-composite sandwich panels.

The properties of the casing material and their selection are as should be understood by one skilled in the art.

However, the forgoing should not be seen as limiting on the scope of the present invention. For example, it is also envisaged that the casing material can be any material suitable for use in forming a composite sandwich panel.

Throughout the present specification, reference to the term "bulk material" should be understood as referring to a material which can fill the gap between two sections of casing materials.

In a particularly preferred embodiment, the bulk material is an insulative material which prevents or reduces transfer of heat through the sandwich panel.

An example of a suitable insulative material is a polyurethane foam. This is as should be understood one skilled in the art.

However, the foregoing should not be seen limiting on the scope of the present invention and alternatives for the bulk material are envisaged, including polystyrene or other materials.

Throughout the present specification reference to the term "locking element" should be understood as referring to a component that secures, or assists in securing, adjacent composite sandwich panels together.

In a particularly preferred embodiment, locking elements according to the present invention are pairs of locking element halves. In use, each of locking element half engages with a corresponding element half so as to secure adjacent sandwich panels together.

In a particularly preferred embodiment, the locking element halves are cam-locks. In this embodiment, the cam-locks are each one of a pair of male and female components that can selectively engage with each other. The male element has a member which can be rotated to a position it engage a corresponding female element. Rotation is achieved using a key or other component.

However, the forgoing should not be seen as limiting and alternatives are envisaged. Those alternatives include locking elements in the form of spring loaded detents and overlapping flange fasteners.

In a particularly preferred embodiment, the locking elements have a feet with a portion configured to fit within a corresponding cavity in a section of a casing material forming part of the composite building element.

In a preferred embodiment, the locking portions include a web.

Throughout the present specification, reference to the term "web" should be understood as meaning an open lattice.

The web is useful as a bulk material such as polyurethane foam can expand into and completely surround the web. This assists in securing the locking element in position within a composite sandwich panel according to the present invention.

It also assists in holding the locking elements in position so that they are better able to engage with corresponding locking elements on adjacent sandwich panels.

However, it is also envisaged that the present inventions may not include webs. Accordingly the forgoing should not be seen as limiting.

Throughout the present specification, reference to the term "securing the locking element to one of the sections of casing material" should be understood as meaning attaching to the material at a specific position.

In a preferred embodiment, securing is achieved through interaction of the locking element with a corresponding cavity in a length of casing material.

However, the forgoing should not be seen as limiting on the scope of the present invention. It is also envisaged that securing of the locking element to a length of casing material could be achieved using other techniques. For instance, the locking element could be secured using welding, adhesives, or temporary fasteners in the form of clamps.

The inventors have discovered that securing the locking element to the length of casing material is important to achieving a continuous method of manufacturing a composite sandwich panel. This is because the locking element is fixed in a defined position relative to the length of casing material. This feature in turn enables a continuous feed of casing material, into and through, a moulding station. There is no need to cut lengths of casing materials. Furthermore, the continuous feed of casing materials means that panels are not "batch made" and as such, the manufacturing time is reduced.

These advantages should become clearer from the following description.

In a particularly preferred embodiment, the step of securing a locking element to a sheet of casing material occurs prior to securing a bulk material to the length of casing material.

This is beneficial as it enables the sections of casing material with the locking elements secured thereto to be continuously feed into, and through, the moulding station. This in turn facilities the continuous manufacture of composite sandwich panels of indefinite length.

Throughout the present specification, reference to the term "feed station" should be understood as referring to one or more components that are configured to feed the lengths of casing material so as to facilitate manufacture of a composite sandwich panel.

In a preferred embodiment, the feed station includes a plurality of decoilers or uncoilers. The term de-coiler or un-coiler is as should be understood by one skilled in the art, referring to a devise which can support and unwind a coil of casing material. Reference will be made herein to decoilers.

In this embodiment, each of the decoilers includes a mounting to receive and support a coil of sheet metal, and a drive means configured to rotate the mounting. Rotation of the mounting facilitates feeding of the sheet metal.

This is as should be understood by those skilled in the art.

However, the foregoing should not be seen as limiting on the scope of the present invention. It is also envisaged that other embodiments for the coilers are envisaged including for instance those which do not include drive means.

Throughout the present specification, reference to the term "filling station" should be understood as meaning components configured to secure a bulk material to at least one length of casing material.

The functionality and components of the filling station are selected according to the properties of the bulk material used with the present invention.

In a particularly preferred embodiment, the filling station is a reservoir of liquid(s), and a fluid delivery system.

However, the forgoing should not be seen as limiting. It is also envisaged that the bulk material may be inserted into a gap between two sheets of material in a non-liquid form such as polystyrene sheets. In this embodiment, the filling station may be provided by automated arms or manual loading mechanisms.

Throughout the present specification, reference to the term "insert station" should be understood as meaning components configured to secure locking elements to a section of casing material.

In a preferred embodiment, the insert station is a plurality of automatic arms. The arms are configured to engaged locking elements and position these with respect to sheets of casing material.

In a particularly preferred embodiment, the insert station is configured to position a locking element so that the foot extends into a connection cavity in the length of casing material. This assists in securing, and preferably secures, the locking element to the length of casing material.

However, the forgoing should not be seen as limiting on the scope of the present invention.

In a preferred embodiment, the insert station is configured to secure the locking elements to a length of casing material prior to the bulk material being secured to the casing material. The inventors have surprisingly found that this provides the present inventions with a number of significant advantages. For instance, it simplifies the implementation of a continuous process to manufacture composite sandwich panels.

Furthermore, this feature facilitates for the casing material being continuously fed into and through the filling station, and subsequently pass into a shaping station. Therefore, it is not necessary to cure the bulk material to secure the locking elements and. Therefore the sheet of casing material can be fed through the other components of the system.

Furthermore, securing the locking elements to a length of casing material enables the panels to continue through the process in a continuous feed into, and through, the filling and moulding stations. Accordingly, it is also possible to use the feed rate of casing material to control parameters of the composite sandwich panels produced using the current invention. This is yet a further advantage of the present invention.

In a particularly preferred embodiment, the insert station is configured to apply pressure to the length of casing material to thereby clamp the foot of the locking element within the cavity.

Clamping may be achieved using robotic arms and/or hydraulic presses. However, the forgoing should not be seen as limiting on the scope of the present invention and alternatives are envisaged. Those may include where the locking elements are secured to the sheet of casing material using other mechanisms such as welding, adhesives.

Throughout the present specification, reference to the term "case forming station" should be understood as meaning components configured to deform one or more of the sections of casing material.

In a preferred embodiment, the case forming station includes a roll forming press.

The roll forming press is a standard press as should be known to one skilled in the art. The press is configured to deform one or more side edges of the sections of material as they pass therethrough.

In a preferred embodiment deformation of side edges of the sections of material creates a connection cavity.

Throughout the present specification, reference to the term "connection cavity" should be understood as meaning a cavity into which a foot of a locking element can be inserted so as to facilitate securing of the locking element to a sheet of casing material.

In a preferred embodiment, the case forming station deforms a first edge of a sheet of casing material to create a first connection cavity.

In a particularly preferred embodiment, the case forming station is configured to deform a second edge of a sheet of casing material to create a second connection cavity.

The connection cavities have shapes corresponding to the shapes of locking elements with which they will be used.

Throughout the present specification, reference to the term "shaping station" should be understood as meaning components that facilitate shaping of a composite sandwich panel.

In a preferred embodiment the shaping station limits expansion of a bulk material to thereby shape to sandwich panel.

In a particularly preferred embodiment, the shaping station includes a dual belt roller press. This component applies pressure to the two sheets of casing materials from opposing sides to limit the expansion of the filler material. Accordingly, the dual belt press assists in setting the thickness of sandwich panels manufactured according the present invention.

It is also envisaged that the shaping station may include secondary rollers and belts. For instance, conveyer belts may engage side edges of the filler material as this passes through the shaping station. This prevents the filler material spilling out of the edges of the casing materials.

However, the forgoing should not be seen as limiting on the shape of the present invention. The shaping station may also include additional components to assist in shaping the composite sandwich panels according to the present invention.

For example, the shaping station may include an etching element which scrapes part of the filler material along the side edge so as to create a desired shape.

It is also envisaged that the shaping station may include a taping device. The taping device prevents the side conveyers from sticking to the filler material.

However, the forgoing should not be seen as limiting on the scope of the present invention. In a particularly preferred embodiment, the present invention includes a cutting station.

Throughout the present specification, reference to the term "cutting station" should be understood as meaning one or more components that are configured to cut composite sandwich panels into lengths.

In a preferred embodiment, the cutting station includes an actuator and a cutting element In the particularly preferred embodiment the cutting element is a rotary saw as should be known to are skilled in the art. The characteristics and properties of the rotary saw are selected so as to enable the cutting element to cut through the censored casing material and filer material (once secure).

The cutting elements may be in the form of serrated knives, or other cutting elements which can cut sections of sandwich panels manufactured according to the present invention. Accordingly, the forgoing should not be seen a limiting on the scope of the present invention.

In a preferred embodiment, the cutting station may include a length determining apparatus.

In use, the "length determining apparatus" is configured to control the length of composite sandwich panels manufactured according to the present invention.

In a particularly preferred embodiment, the length determining apparatus is a combination of marking devices and sensors. In use, the marking elements apply indications to the casing material corresponding to a length of panel to be produced. The sensors detect the markings and communicate to the cutting elements where to cut the panels exiting the shaping station.

However, the forgoing should not be seen as limiting on the scope of the present invention.

It should be appreciated from the forgoing discussion that the present invention has a number of advantages.

Firstly the invention enables continuous manufacturing of composite sandwich panel building elements. This is likely to significantly decrease the cost in manufacturing the building elements. For instance, the labour requirement required to position locking elements is removed. In addition, the time required to manufacture particular sections of panels is significantly decreased.

Secondly, securing of locking elements to the casing materials significantly simplifies the process of manufacturing a composite sandwich panel. Once the locking elements are secured to the casing material it is possible to easily connect the bulk materials to the casing elements.

The inventors believe that the concept of securing locking elements to the casing materials prior to securing of filler materials is a significant step away from prevailing industry wisdom. To the inventor's knowledge no one has previously used this step.

Furthermore, the industry wisdom is that accuracy of placing cam-lock connectors can only be achieved in a discontinuous process in which these are secured to the mould prior to attaching of bulk material (fillers). Alternatively, the industry cuts lengths of material and inserts those into a mould in a discontinuous process. The success of the present invention surprisingly disproves the industry wisdom.

In addition, the inventors have experienced considerable difficulty in trying to secure the locking elements to the length of casing material. That step is complicated by the need for a continuous feed of casing material, which results in the casing material constantly moving past a location where the securing is to occur. In effect the target is continuously moving.

However, the inventors have overcome these issues through the unique configuration of the insert station, and its interaction with the other components of the system disclosed herein.

BRIEF DESCRIPTION OF THE DRAWINGS

Further aspects of the present invention will become apparent from the ensuing description which is given by way of example only and with reference to the accompanying drawings in which.

BEST MODES FOR CARRYING OUT THE INVENTION

There is provided a system for manufacturing composite sandwich panels (1), a method of using the system (1) and composite sandwich panels (3) manufactured using the system (1) and method.

Figure 2:
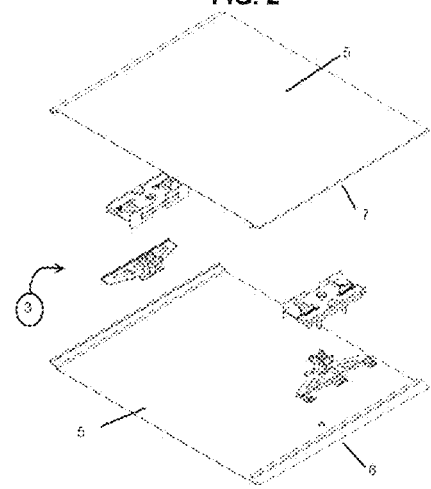
FIG. 2 is an exploded view of a composite sandwich panel.

Referring first to FIGS. 2A and 2B, composite sandwich panel (3) has a first layer of casing material (4) and a second layer of casing material (5). Side edges (6, 7) of the layers of casing material (4, 5) are deformed so as to define a female side edge, generally indicated as (8).

Side edges (9, 10) of layers of casing materials (4, 5) are deformed to define a male side edge, generally indicated as (11).

A male locking element (12) and a female locking element (13) are secured to the layer of casing material (4) so that in-use locking elements (12, 13) can engage with a complementary locking element on an adjacent panel.

The locking elements (12, 13) and securing these to the sandwich panels (3) are discussed in more detail below.

Figure 3A:
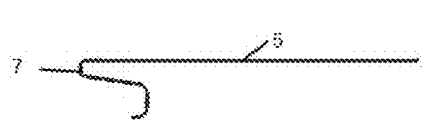
FIG. 3A is an end on view showing side edges of two sheets of casing materials forming a female edge of composite building element.
Figure 3A:
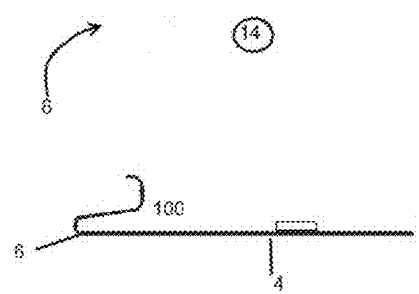
Figure 3B:
FIG. 3B is an end on view showing side edges of two sheets of casing materials forming a male edge of a composite building element.
Figure 3B:
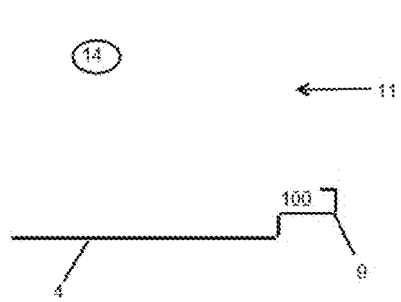
Figure 3C:
FIG. 3C is an end on view showing interaction of male and female side edges of adjacent composite building elements according to the present invention.
Figure 3C:
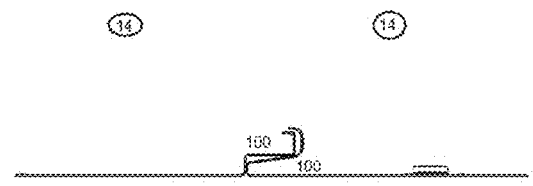
Figure 3D:
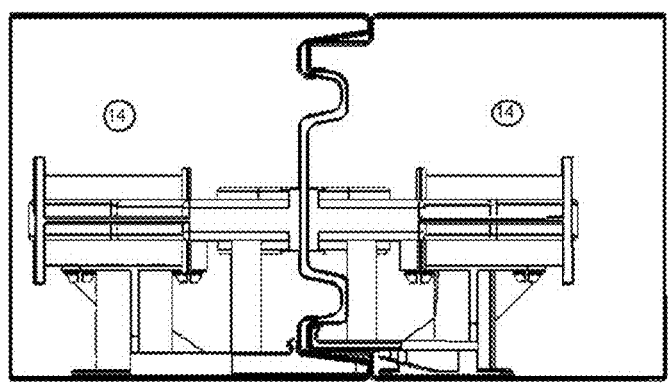
FIG. 3D is an end on view of two adjacent panels secured together.
Figure 4A:
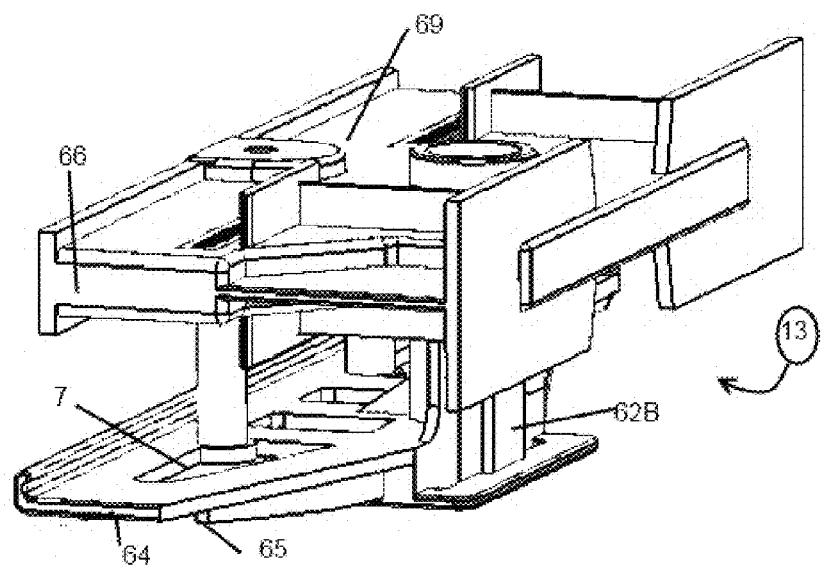
FIG. 4A is an end on view of a male locking element.
Figure 4B:
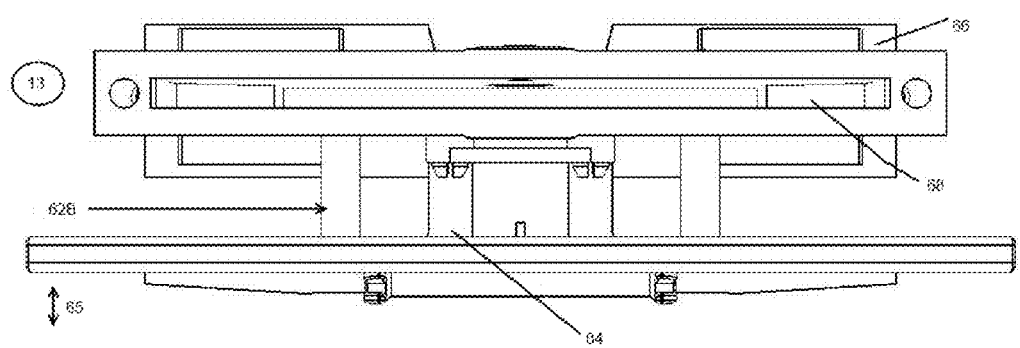
FIG. 4B is a front on view of FIG. 4A.
Figure 5A:
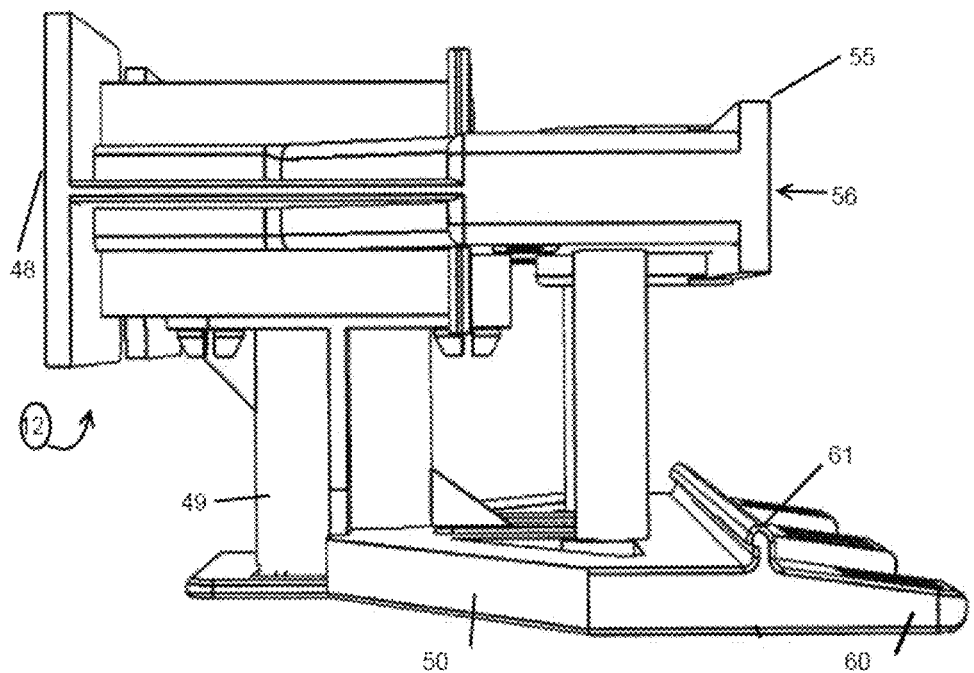
FIG. 5A is an end on view of a female locking element.
Figure 5B:
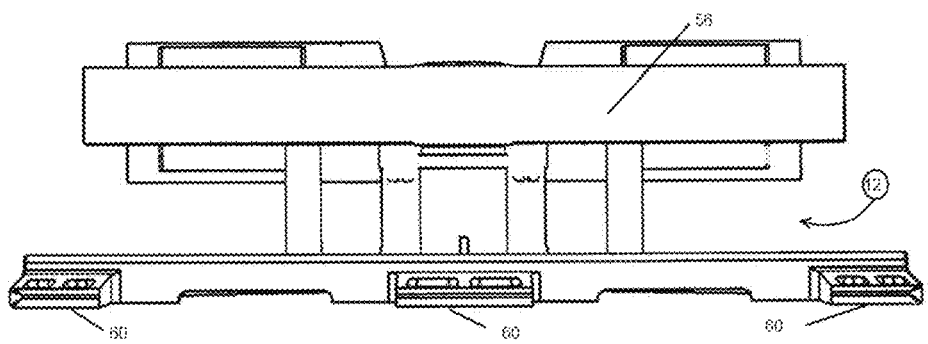
FIG. 5B is a front view of FIG. 5A.
Figure 6:
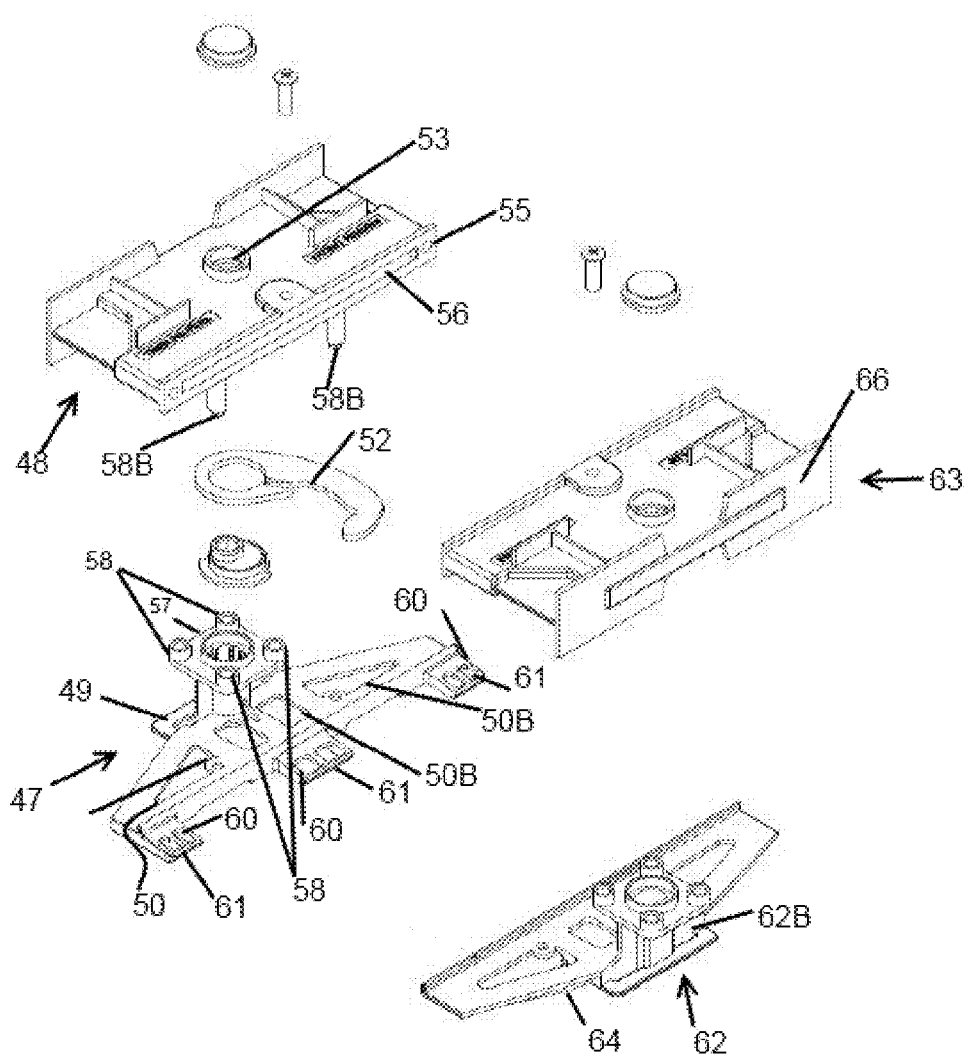
FIG. 6 is an exploded view of male and female locking elements.

The male and female edges (11, 8) are complementary. Therefore, the male side edge (11) can extend into the female edge (8). This is as generally as shown in FIGS. 3 and 3DB.

The gap between layers of casing material (4, 5), generally indicated as (14) is filled with a bulk material in the form of a polyurethane foam. For simplicities sake the polyurethane foam is not shown in the Figures.

Manufacture and other aspects of the sandwich panel (3) should become clearer from the following description.

Figure 1:
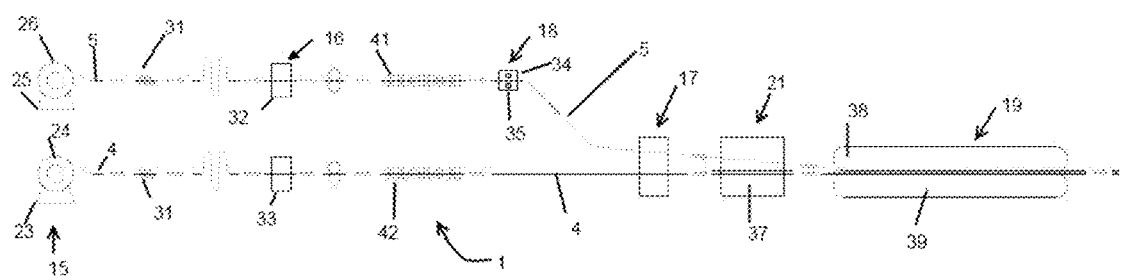
FIG. 1 is a schematic of a system according to the present invention.
Figure 7:
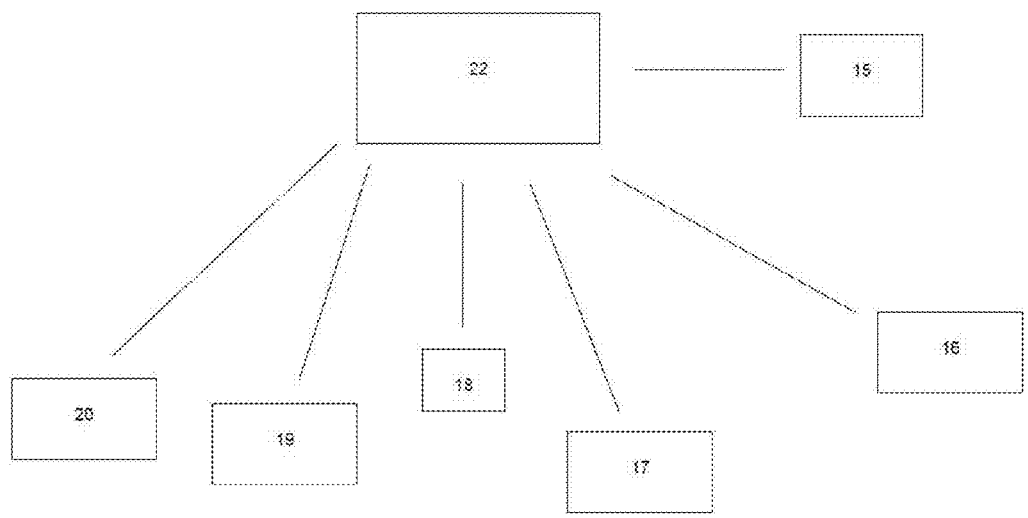
FIG. 7 is functional architecture showing connectivity of components of a system according to the present invention.

Referring now to FIGS. 1 and 7.

The system (1) generally includes:

a feed station (15);
a case forming station (16);
a heating station (17);
an insert station (18);
a shaping station (19);
a cutting station (20);
a filling station (21).

The method of using the (1) is continuous meaning that sandwich panels (3) are produced from the shaping station (19) in indefinite lengths.

The components of the system (1) are linked to and in communication with a computer processing apparatus (22).

The computer processing apparatus is configured to control operation of each of the components of the system (1). This may include the speed at which the system (1) produces sandwich panels (3), or other parameters of the system's operation.

Further aspects of the system will now be discussed with reference to each of the stations.

Stations

The feed station (15) includes a first decoiler (23) holding a first roll (24) and a second decoiler (25) holding a second roll (26) of casing material in the form of steel. The casing material on roll (24) will be casing material (4) while the material of roll (26) will be casing material (5) in sandwich panel (3). Therefore the casing material provided by rolls (24, 26) being fed through the system (1) will be referred to as (4, 5).

Each of the rolls (24, 26) is coated with a food grade quality coating, in the form of paint (not shown).

The first and second decoilers (23, 25) include drive means (27, 28) configured to rotate the first and second rolls (24, 26). This facilitates feeding of lengths of casing material into the case forming station.

Figure 8:
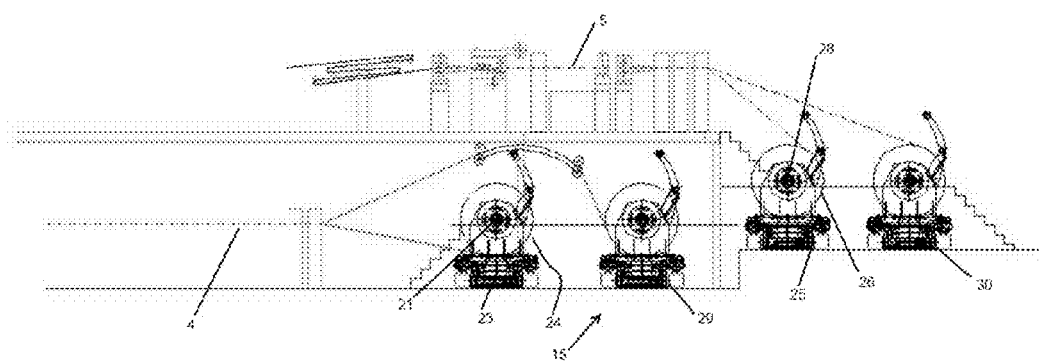
FIG. 8 is a close up side view of a feed station according to the present invention.
Figure 9A:
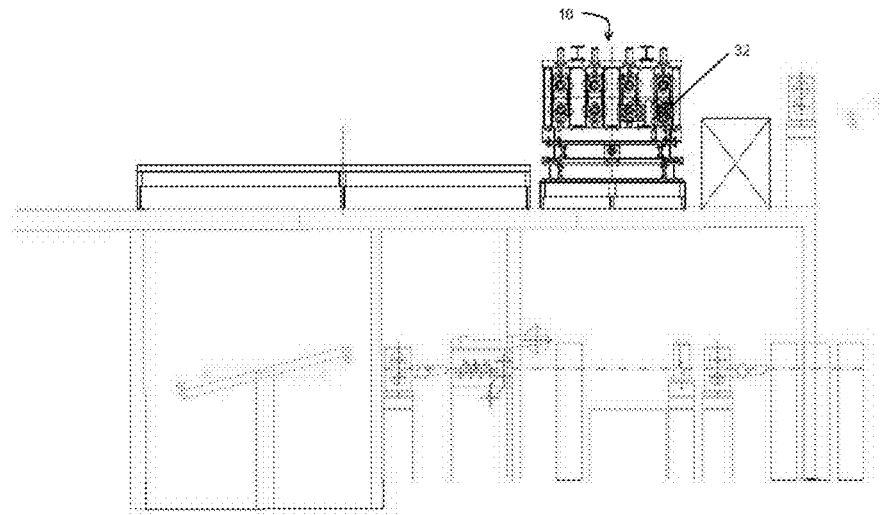
FIGS. 9A & 9B are close up views of a case forming station.
Figure 9B:
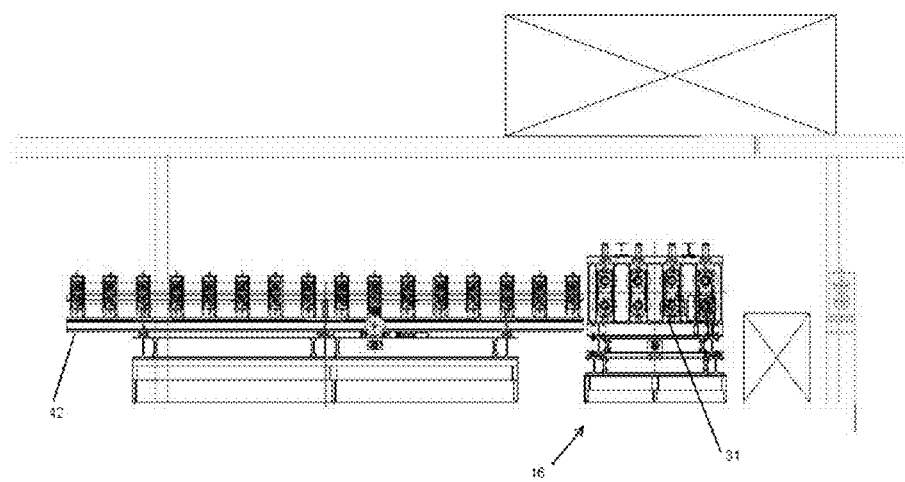
Figure 10A:
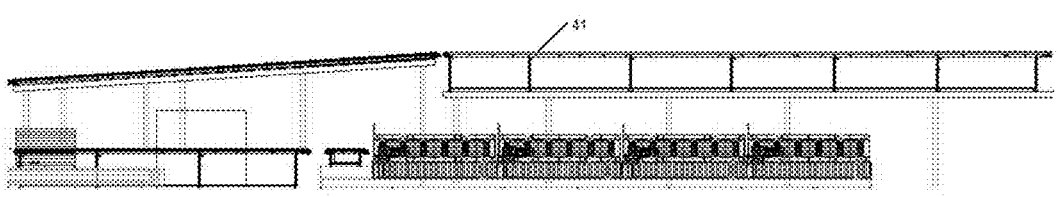
FIGS. 10A & 10B are side views showing transition between a case forming station and a shaping station.
Figure 10B:
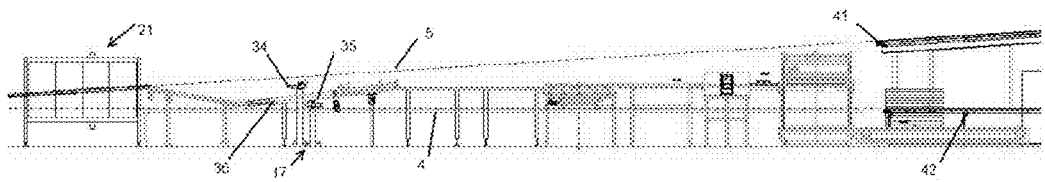
Figure 11:
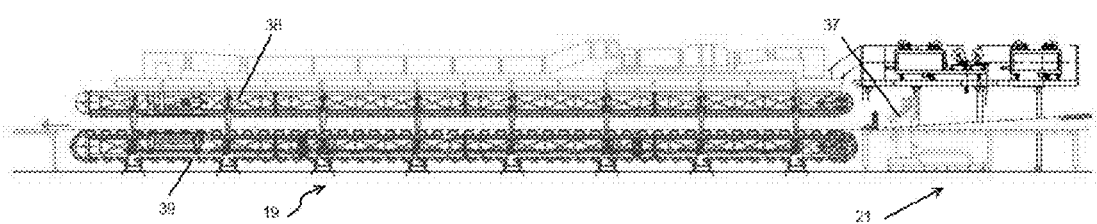
FIG. 11 is a side view of an insert station and a shaping station.
Figure 12:
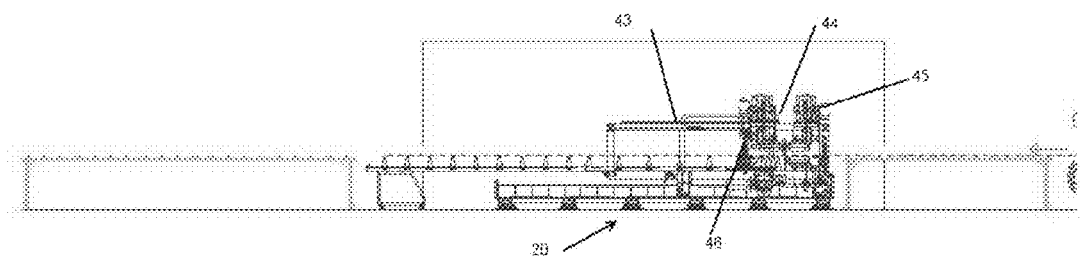
FIG. 12 is a side view of a cutting station.

The feed station (15) also includes secondary decoilers (29, 30) as are shown in FIG. 8. In use the secondary decoilers (29, 30) facilitate continuous manufacturing of composite sandwich panels (3). The secondary decoilers (29, 30) are configured to feed casing material that can be joined to an end of casing material on the first and second rolls (24, 26). This is as should be understood by one skilled in the art.

Reference will be made herein to the direction of travel of the casing material (4, 5). This should be understood as movement of the casing material (4, 5) from one component to another, eventually passing from feed station (15) to cutting station (20). The direction of travel is generally indicated by arrows in FIG. 1.

Accumulators, indicated as (31) hold additional length of the casing material (4, 5). This facilitates securing ends of casing materials on rolls on decoilers (23, 25, 29, 30) together and thereby provision of a continuous method. This is as should be understood by one skilled in the art.

Case forming station (16) includes a first roll press (32) and second roll press (33).

The first and second roll presses (32, 33) are each configured to deform a side edge (6, 7, 9, or 10) of the sheets of casing material (4, 5) as these pass therethrough. Reformation of the side edges (6, 7, 9 or 10) creates connection cavities (100). The connection cavities (100) are best seen in FIGS. 3C and 3D.

The deformation of the sheets of casing material (4, 5) will be discussed in more detail below.

Insert station (18) includes first insert robot (34) and second insert robot (35) mounted on a carriage (36).

The carriage (36) is configured to move along the direction of movement of the casing materials (4, 5) as these move from first and second roll presses (32, 33) towards filling station (21).

The first and second insert robots (34, 35) and carriage (36) are substantially below casing material (4) and above casing material (5) e.g. the carriage (36) is in between the sheets of casing material (4, 5).

A store (not shown) of male locking elements (12) is positioned adjacent to first insert robot (34). A store (not shown) of female locking elements (13) is positioned adjacent to second robot insert (35). Each of the first and second insert robots (34, 35) is configured to pick up a locking element (12 or 13) from a store and insert that into a connection cavity in the sheets of casing material (4, 5).

A heating station (17) in the form of infrared heaters is configured to heat the casing material (4, 5) as this passes from the case forming station (16) to the filling station (21).

Filling station (21) includes an injection mechanism, indicated generally as (37). The injection mechanism (37) is configured to deliver a polyurethane foam under pressure, which facilitates mixing of components in the foam.

The injection mechanism (37) is as should be known to those skilled in the art.

The shaping station (19) includes a dual belt press including a top press element (38) and a bottom press element (39). The spacing of the top and bottom press elements can be altered.

The top and bottom press elements (38, 39) are commercially available moulds currently used in the known systems for continuous manufacture of composite sandwich panel building elements. Accordingly, the top and bottom press elements (38, 39) are as should be known to one skilled in the art.

The shaping station (16) also includes taping devices (not visible). The taping devices are configured to apply a tape material to a polyurethane foam, in the gaps between side edges (6-10) of casing materials (4, 5).

Supplementary belt presses (not shown) are position to be on distal side of casing materials (4, 5) to each other, and extend along the direction of travel of casing materials (4, 5).

The supplementary presses (not shown) are configured to apply pressure to the sheets of casing material (4, 5) as they pass therethrough. This, in combination with the controlling of the spacing of the top and bottom press elements (38, 39), assists in controlling the volume to which the polyurethane foam can expand.

The secondary press (42) prevents polyurethane foam expanding beyond the side edges of casing materials (4, 5).

The system (1) also includes supplementary rollers (41) and conveyors (42). The rollers (41) and conveyors (42) assist in moving the casing materials (4, 5) through components according to the present invention.

Cutting station (20) includes a carriage (43) and cutting element (44) in the form of a rotary saw. The carriage (43) is configured to move the rotary saw along the direction of movement of the casing material (4, 5). Accordingly, the carriage facilitates the cutting element (44) cutting the casing material (4, 5) as this exits from the shaping station (19) without the need to stop the feed of casing materials (4, 5). Accordingly, it is possible to produce sandwich panels (3) according to the present invention continuously in the form of a marking.

A marking device (45) is configured to apply a visual indication onto a sheet of casing material (4).

The marking is identified by sensor (46) in cutting station (20). The computer processing apparatus (22) receives a signal indicative of marking and sends instructions to cutting element (44) to cut sandwich panel (3) at a desired length.

Locking Elements

Referring now to FIG. 4A-6 showing male and female locking elements (12, 13) according to the present invention.

The male locking element (12) is formed from a first part (47) and a second part (48).

First part has a body (49) and a foot portion (50). In use, foot (50) abuts an inner surface of a casing material (4).

The second part (48) includes a housing (51). The housing has a locking member (52) rotatably mounted therein. An opening (53) in top surface (54) of housing (51) enables a key (not shown) to be used to engage and rotate the locking member (52).

A side (55) of the housing (51) has an aperture (56). The aperture (56) enables the member (52) to protrude from housing (51) and to engage with a female locking element (13) in an adjacent composite sandwich panel (3) when the locking elements (12, 13) are in use.

The legs (60) extend away from the body (49). Each leg (60) has an upturned lip (61).

Top surface (57) of first part (49) has a plurality of apertures (58). The apertures (58) are configured to receive detents (58B) on housing (51).

The apertures (58) and detents (58B) engage in a press fit manner so as to secure first part (47) and second part (48) together.

Foot (50) has a plurality of apertures 50B. The apertures provided a lattice work web. A polyurethane foam can expand through the lattice work web to facilitate securing the locking element (12) with respect to casing materials (4, 5) and thereby forming of a sandwich panel (3).

Female locking element (13) is formed from a first part (62) and a second part (63).

The first part (62) has a body (62B) and a foot (64). The foot (64) extends away from body (62B). The foot (64) has a step, indicated as (65).

The second part (63) has a housing (66). A female locking member (not shown) is secured in housing (66). Side (68) of housing (66) has an aperture (68B). This enables rotation of male locking member to extend through aperture (69) into the housing (66) and engage the female locking element (not shown) so as to secure the locking elements (12, 13) together.

First part (62) top surface (69), has a plurality of apertures (70). The apertures (70) are configured to receive detents (71) on housing (66). The apertures (70) and detents (71) engage in a press fit manner so as to secure first and second parts together (62, 63).

The first parts (62, 47) can be selected to have a height corresponding to the size of panel (3) being manufactured. This is important to ensure that second parts (48, 63) are positioned substantially within the centre of a panel.

The locking elements (12, 13) are made from a reinforced plastics material. This is beneficial in reducing transfer of heat through composite sandwich panels according to the present inventions.

Method

Referring now primarily to FIG. 1.

The desired parameters for panels (3) to be produced by the system (1) are input to computer processing apparatus (22). This may include selection of:
1. fire safety rating for panels;
2. panel length;
3. total number of locking elements required per panel;
4. separation of (centre spacing of) of locking elements;
5. insulative (heat transfer) properties for the panel;
6. panel thickness.

These properties are as should be understood by one skilled in the art.

The computer processing apparatus calculates parameters for operation of the system (1), including:
feed rate for casing materials (4, 5);
rise time required for polyurethane foam;
separation for top and bottom press elements.

Reference will be made herein to the term "feed rate". This should be understood as referring to the rate (meters per minute) of casing material entering into shaping station. It should be understood that reference to the term "feed rate" also describes the rate of movement of the casing material along its direction of travel at other stages of the system (1).

The computer processing apparatus sends instructions to the components of the system (1).

Decoilers (23, 25) are engaged to rotate so as to feed casing materials (4, 5) into roll formers.

Roll presses (32, 33) deform side edges (7-10) of casing materials (4, 5). The shape of the side edges of the casing materials (4, 5) as these exit from roll presses (25, 35) is best seen in FIGS. 3A-3C.

Rotation of roll presses (32, 33) feeds casing material (4, 5) towards and through insert station (18).

First insert robot (34) engages and lifts a male locking element (12) and second insert robot (35) engages and lifts a female locking element (13).

The robots position locking elements (12, 13) with respect to side edges of casing material (4). Carriage (36) moves arms along direction of travel at the feed rate. The insert robots push locking members (12, 13) so that the lip (61) and step (65) are each inserted into one of the connection cavities (100).

Presses (not shown) applies pressure to casing material (4). This clamps and deforms casing material (4) around lip (61) and step (65).

Insert robots disengage locking elements (12, 13).

Carriage (36) returns robots (34, 35) to the start point so that they can secure subsequent locking elements (12, 13) to casing material (4).

Marker device (45) applies markings to a top surface of casing material (4). The markings indicate the division between two panels being manufactures by system (1), and corresponds to the location at which cutting element (44) must cut the panel exiting from the shaping station.

The above process is repeated to enable robots to secure sufficient locking elements to casing material (4) according to instructions programmed into computer programming apparatus (22).

Heating station (17) applies infrared radiation to casing elements (4, 5) so as to heat these to a temperature between 40-50° C.

Filing station (21) delivers a polyurethane foam into casing material (5) according to instructions sent by the computer programming apparatus.

The polyurethane foam may vary in blowing agent delivered, foam ingredients so as to alter properties such as fire resistance and/or insulative values, or volume of polyurethane foam delivered.

In effect, casing material (5) which has been deformed by roll press (33) forms a tray to receive the polyurethane foam.

The foam starts to expand as casing materials (4, 5) moves from filing station (22) towards shaping station (19).

The rate of travel of casing material (5) from filling station to shaping station (19) allows the polyurethane foam to cure. The curing time is determined according to parameters as should be known by one skilled in the art. The cure time will depend on the parameters for the composite sandwich panel (3) being produced. It may also vary according to the distance between filling station (22) and shaping station (19).

Casing materials (4, 5) converge to have a separation substantially equal to the desired thickness of panel (3). As the materials converge, and the polyurethane foam expands, the locking elements (12, 13) are substantially submerged within polyurethane foam. The foam's expansion causes the foam to fill in the apertures in first parts of locking elements.

Taping devices (not shown) apply tape to polyurethane foam in the gap between side edges (7-10) of casing materials (4, 5).

Shaping station (19) applies pressure to the top and bottom surfaces of casing materials (4, 5) and to polyurethane via taped material. The shaping station (19) limits expansion of the polyurethane foam. Therefore, the shaping station defines the dimensions of the panel.

The time taken for casing materials (4, 5) to move between filling station (21) and shaping station (19) is determined according to the rise time required to achieve a panel (3) having desired dimensions. This is as should be understood by one skilled in the art.

The sheets of casing material (4, 5) with the polyurethane foam exit the shaping station (19) and are continuously fed into the cutting station (20).

The marking device (45) applies a visual indication onto a sheet of casing material (4).

The carriage (43) moves the rotary saw along the direction of movement of the casing materials (4, 5) at the identical rate of movement. The cutting element cuts the casing materials (4, 5) and the bulk material so as to provide a composite sandwich panel (3) having a desired length.

The casing materials (4, 5) and bulk material continue to be fed out of shaping station. The carriage (43) returns the cutting element towards the shaping station (19). This enables the cutting element to cut the casing materials (4, 5) and bulk material to provide another composite sandwich panel (3) having a desired length. The above steps are repeated as necessary.

Aspects of the present invention have been described by way of example only and it should be appreciated that modifications and additions may be made thereto without departing from the scope thereof as defined in the appended claims.

What we claim is:

1. A system for manufacturing composite building elements, the system comprising:
    a filling station configured to secure a bulk material to a first sheet of casing material,
    a feed station configured to feed the first sheet of casing material into the filling station,
    an insert station that is configured to secure a locking element to the first sheet of casing material before the bulk material is secured to the sheet of casing material,
    wherein the system is configured to feed the first sheet of casing material from the insert station into the filling station.

2. The system of claim 1, wherein the feed station is configured to feed a second sheet of a casing material into the filling station so that there is a gap between the first and second sheets.

3. The system of claim 2, wherein the feed station is configured to continuously feed the sheets of casing material into a case: forming station.

4. The system of claim 1, wherein the insert station is configured to insert a leg portion of the locking element into a connection cavity in the sheet of casing material.

5. The system of claim 2, wherein the insert station includes a plurality of automated arms.

6. The system of claim 5, wherein the automated arms are configured to clamp the sheet of casing material to a leg portion of the locking element.

7. The system of claim 5, wherein the automated arms are substantially below the first sheet of casing material.

8. The system of claim 3, wherein the case forming station is a roll forming press.

9. The system of claim 3, wherein the case forming station is configured to deform at least one of the sheets of casing material so as to create a connection cavity.

10. The system of claim 9, wherein the case forming station is configured to deform the sheets of casing material to create a connection cavity having a shape corresponding to the shape of a leg of a locking element.

11. The system of claim 3, wherein the filling station is configured to inject a filler material into the gap between the first and second lengths of casing material.

* * * * *

UNITED STATES PATENT AND TRADEMARK OFFICE
CERTIFICATE OF CORRECTION

PATENT NO. : 9,789,676 B2  
APPLICATION NO. : 14/394471  
DATED : October 17, 2017  
INVENTOR(S) : Bernard Robert Nasr et al.

It is certified that error appears in the above-identified patent and that said Letters Patent is hereby corrected as shown below:

In the Claims

Claim 3, Column 15, Lines 22-24 the text reading: "The system of claim 2, wherein the feed station is configured to continuously feed the sheets of casing material into a case: forming station." should be replaced with "The system of claim 2, wherein the feed station is configured to continuously feed the sheets of casing material into a case-forming station."

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*